US009088461B2

(12) United States Patent
Burckart et al.

(10) Patent No.: US 9,088,461 B2
(45) Date of Patent: Jul. 21, 2015

(54) COMMON WEB ACCESSIBLE DATA STORE FOR CLIENT SIDE PAGE PROCESSING

(75) Inventors: Erik J. Burckart, Raleigh, NC (US); Andrew J. Ivory, Wake Forest, NC (US); Todd E. Kaplinger, Raleigh, NC (US); Aaron K. Shook, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 256 days.

(21) Appl. No.: 13/529,639

(22) Filed: Jun. 21, 2012

(65) Prior Publication Data

US 2013/0346542 A1    Dec. 26, 2013

(51) Int. Cl.
*G06F 15/16* (2006.01)
*H04L 29/08* (2006.01)

(52) U.S. Cl.
CPC ...... *H04L 29/08549* (2013.01); *H04L 67/2852* (2013.01)

(58) Field of Classification Search
USPC .......................................... 709/217, 213, 231
See application file for complete search history.

(56) References Cited

U.S. PATENT DOCUMENTS 6,453,321 B1 * 9/2002 Hill et al. .............................. 1/1
8,195,763 B2 * 6/2012 Knowles et al. .............. 709/217
2003/0195940 A1 * 10/2003 Basu et al. ..................... 709/213
2009/0172274 A1   7/2009 Nochimowski et al.
2009/0235349 A1 * 9/2009 Lai et al. ........................... 726/14
2010/0330976 A1 * 12/2010 Berna Fornies et al. ...... 455/419
2011/0157219 A1 * 6/2011 Chakra et al. .................. 345/619
2011/0276569 A1   11/2011 Kanefsky
2011/0307442 A1 * 12/2011 Sharma et al. ................. 707/611
2012/0016931 A1 * 1/2012 Singh et al. .................... 709/203
2012/0036264 A1   2/2012 Jiang et al.
2012/0260157 A1 * 10/2012 Zhu et al. ....................... 715/234
2013/0054514 A1   2/2013 Barrett-Kahn et al.

* cited by examiner

*Primary Examiner* — Liangche A Wang
*Assistant Examiner* — Melaku Habtemariam
(74) *Attorney, Agent, or Firm* — Steven M. Greenberg, Esq.; CRGO LAW

(57) ABSTRACT

Embodiments of the present invention provide a method, system and computer program product for shared data storage in page processing over a computer communications network. In an embodiment of the invention, a method of shared data storage has been provided for page processing over a computer communications network. The method can include registering a content browser executing in memory of a computer with a remote storage service and receiving content from a content server over the computer communications network. The method additionally can include invoking in the content browser an instance of a localStorage object to cache data associated with the content according to a unique key. Thereafter, in response to the invocation of the instance of the localStorage object, the data can be stored in the remote storage service in reference to the unique key.

11 Claims, 1 Drawing Sheet

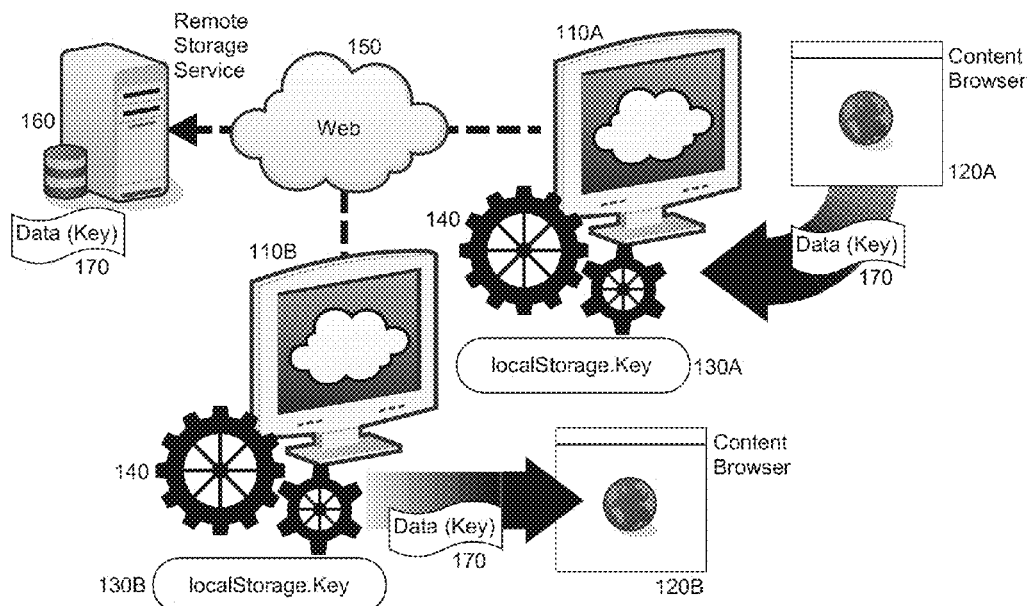
FIG. 1
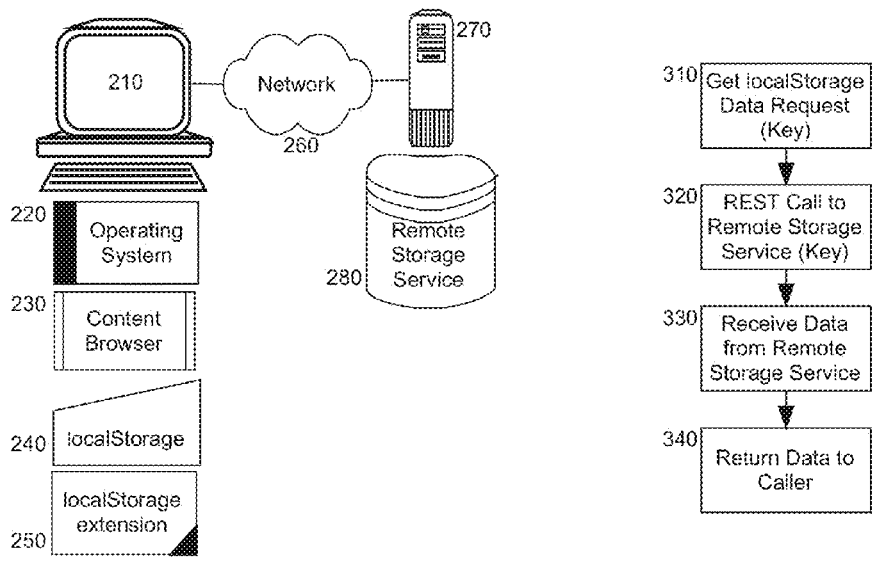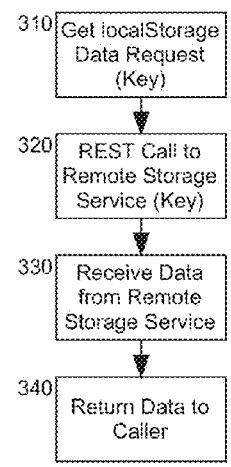
FIG. 2  FIG. 3

COMMON WEB ACCESSIBLE DATA STORE FOR CLIENT SIDE PAGE PROCESSING

BACKGROUND OF THE INVENTION

1. Field of the Invention

The present invention relates to state information storage during client side page processing and more particularly to Web data storage for client side page processing.

2. Description of the Related Art

Page processing refers to the receipt, interpretation and rendering of a markup language defined page in a content browser. The most well-known form of a page processing content browser at present is the venerable Web browser in which Web pages are received, processed and rendered. In a conventional Web browser, a markup language page—typically a page defined according to the hypertext markup language (HTML) markup language specification—can be received, interpreted and rendered in a display of a computer. Integral to the HTML processing capabilities of the Web browser is the cookie feature.

The cookie feature provides for short term data storage of state information for a Web page. Cookies have been used for many reasons including session management, personalization and tracking. However, according to the hypertext transfer protocol (HTTP) specification on statement management, a Web browser in respect to the use of cookies need only support a minimal number of cookies. In particular, according to the HTTP specification, a Web browser is expected only to be able to store three-hundred cookies of four kilobytes each, and only twenty cookies per server or domain.

While the cookie feature of HTML can provide a tempting mechanism for data storage in page processing, for many applications—and in particular in light of advances in the acquisition and transfer of digital information such as digital imagery and audio, a client side mechanism of greater capacity is desirable. The HTML version 5 specification addresses this need in defining "Web Storage". Web Storage picks up where cookies left off. In this regard, Web Storage provides both a simple application programming interface (API) to getter and setter methods for key/value pairs and also a default disk space quota of no less than five megabytes per fully qualified domain name. Within the HTML version 5 specification, Web Storage provides for two object for storing data on a client. The first object is a "localStorage" object that stores data on the client without expiration. The second object is "sessionStorage" which stores data on a client for the duration of a single session.

Consequently, the Web Storage mechanism allows the page developer to define storage for a page of more than just basic user/session info on the client-side. Rather, the Web Storage mechanism permits the storage of user preference settings, localization data, temporary offline storage for batching server writes and much more. Yet further, data stored according to the Web Storage mechanism can be accessed using the familiar JAVASCRIPT™ scripting language, which permits the developer to leverage client-side scripting to do many things that have traditionally involved server-side programming and relational databases.

Despite the advancement in client side storage offered by the Web Storage mechanism in HTML version 5, the Web Storage mechanism is not without fault. First, as clients become more robust and more application code executes within the content browser, the need to cache client side generated content increases. Due to the limitations in the size of the cache, the ability to cache large amounts of client generated content is not available. Secondly, as the number of devices increase per user, there is a increased value in having the ability to share data between these devices which is not possible with the Web Storage mechanism in HTML version 5. Of course, an application server could be leveraged for storing shared data. However, the use of an application sever to store shared data conflicts with a primary motivation for the Web Storage mechanism—to offload storage of user data from the application server—particularly when running applications offline.

BRIEF SUMMARY OF THE INVENTION

Embodiments of the present invention address deficiencies of the art in respect to data storage during page processing and provide a novel and non-obvious method, system and computer program product for shared data storage in page processing over a computer communications network. In an embodiment of the invention, a method of shared data storage has been provided for page processing over a computer communications network. The method can include registering a content browser executing in memory of a computer with a remote storage service and receiving content from a content server over the computer communications network. The method additionally can include invoking in the content browser an instance of a localStorage object provided by a content browser supporting Web storage in order to cache data associated with the content according to a unique key. Thereafter, in response to the invocation of the instance of the localStorage object, the data can be stored in the remote storage service in reference to the unique key. Conversely, the unique key subsequently can be retrieved and the instance of the localStorage object can be invoked with the unique key. As before, in response to the invocation of the instance of the localStorage object with the unique key, the data can be retrieved from the remote storage service with reference to the unique key.

In another embodiment of the invention, a content browsing data processing system can be configured for shared data storage in page processing. The system can include a host computer with at least one processor and memory and a content browser executing in the memory of the host computer. Of note, the content browser can provide a localStorage object configured for instantiation when rendering a page in the content browser. Finally, an extension to the localStorage object can be provided to include program code enabled to respond to requests to cache data in an instance of the localStorage object in reference to a unique key by storing the data in remote storage service over a computer communications network in reference to the unique key.

In one aspect of the embodiment, the remote storage service is a Web accessible resource by way of a representative state transfer (REST) API. In another aspect of the embodiment, the content browser can be configured to access the remote storage service at a specified Web accessible uniform resource identifier (URI). In yet another aspect of the embodiment, a Web application rendered in the content browser can be configured to access the remote storage service at a specified Web accessible URI.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a pictorial illustration of a process for shared data storage in page processing over a computer communications network;

FIG. 2 is a schematic illustration of a page processing data processing system configured for shared data storage over a computer communications network; and, FIG. 3 is a flow chart illustrating a process for shared data storage in page processing over a computer communications network.

DETAILED DESCRIPTION OF THE INVENTION

Embodiments of the invention provide for shared data storage in page processing over a computer communications network. In an embodiment of the invention, multiple different client browsers can configure remote storage in a remote storage service. The remote storage can be accessed through an extension to a localStorage object. Thereafter, data generated in rendering content in one of the different client browsers can be cached through invocation of an instance of the localStorage object in association with a unique key and the data can be accessed by another of the different client browsers through invocation of another instance of the localStorage object in reference to the unique key. In this way, the functionality of the Web Storage mechanism of HTML version 5 can be leveraged without the space and standalone limitations associated therewith.

In further illustration, FIG. 1 pictorially shows a process for shared data storage in page processing over a computer communications network. As shown in FIG. 1, different content browsers 120A, 120B of different computers 110A, 110B can register with a remote storage service 160 over a computer communications network 150 such as the World Wide Web ("Web"). Each of the content browsers 120A, 120B can provide a localStorage object 130A, 130B configured for instantiation responsive to Web Storage requests in respective ones of the content browsers 120A, 120B. Each of the localStorage objects 130A, 130B, however, can be extended according to extension 140 to route data access requests for data 170 to the remote storage service 160 according to unique key. In this way, the Web Storage mechanism of the content browsers 120A, 120B can be supported without the space limitation of 5 megabytes while enabling sharing of data between the different content browsers 120A, 120B.

The process described in connection with FIG. 1 can be implemented within a page processing data processing system. In yet further illustration, FIG. 2 schematically shows of a page processing data processing system configured for shared data storage over a computer communications network. The system can include a client computer 210 with at least one processor and memory supporting the execution of an operating system 220. The operating system 220 in turn can host the operation of a content browser 230, such as a Web browser supporting HTML version 5. The content browser 230 in turn can provide support for different instances of a localStorage object 240.

Of note, an extension 250 to the localStorage object can be provided. The extension 250 can include program code that when executed in the memory of the client computer 210 can receive data requests in an instance of the localStorage object in association with a unique key. In the instance of a request to cache data in local storage, a remote storage service 280 hosted within host server 270 can be accessed over computer communications network 260 with a directive to store the data using the unique key. Optionally, one or more storage parameters can be provided in connection with the request. The storage parameter or parameters, for example, can be cache control parameters that specify a cache invalidation policy for the data associated with the request including when the associated data can be removed from the local storage. In one aspect of the embodiment, the cache control parameters can be specified as part of an HTML cache control header that specifies when corresponding content referenced by a requests expires within a cache.

In operation, the request can be directed utilizing a REST API to the remote storage service 280. Optionally, the URI to the remote storage service 280 can be set according to a configuration of the content browser 230, or according to a configuration of a Web application rendered and executing in the content browser. Conversely, in the instance of a request to retrieve data from local storage according to a unique key, the remote storage service 280 can be accessed over the computer communications network 260 with a directive to retrieve data using the unique key.

In even yet further illustration of the operation of the extension 250 the localStorage object 240 during retrieval of data using Web Storage, FIG. 3 is a flow chart illustrating a process for shared data storage in page processing over a computer communications network. Beginning in block 310, a localStorage data request can be received from a calling Web page in respect to a unique key. In block 320, a REST call to the remote storage service can be provided in conjunction with the unique key. In block 330, data can be received from the remote storage service in association with the unique key. Finally, in block 340, the received data can be returned to the calling Web page.

Of note, the use of shared data storage through Web storage lends itself to a centralized server in which a data processing system managed by one entity can publish a platform-agnostic, uniform API through which different service clients can access remote caching for a fee. End users registering for this service can specify a particular location of a remote cache for use during content browsing, the size of the remote cache as well as how the cache can be shared when multiple devices are used to access the same content stored in the cache. Thus, caching as opposed to storage in general can be pushed to the cloud so as to accommodate different platform devices hosting respectively different content browsers, irrespective of the physical limitations of those devices such as mobile devices with limited fixed storage or memory.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible

We claim

1. A content browsing data processing system configured for shared data storage in page processing, the system comprising:

a host computer with at least one processor and memory;

a content browser executing in the memory of the host computer, the content browser providing a localStorage object defined in a Web storage application programming interface of the hypertext markup language and configured for instantiation when rendering a page in the content browser; and, an extension to the localStorage object comprising program code enabled to respond to requests to cache data in an instance of the localStorage object in reference to a unique key by storing the data in remote storage service over a computer communications network in reference to the unique key and to respond to requests to retrieve the data from the instance of the localStorage obiect in reference to the unique key by retrieving the data from the remote storage service over the computer communications network with reference to the unique key.

2. The system of claim 1, wherein the remote storage service is a Web accessible resource by way of a representative state transfer (REST) application programming interface (API).

3. The system of claim 2, wherein the content browser is configured to access the remote storage service at a specified Web accessible uniform resource identifier (URI).

4. The system of claim 2, further comprising a Web application rendered in the content browser and configured to access the remote storage service at a specified Web accessible uniform resource identifier (URI).

5. The system of claim 1, wherein the localStorage object is invoked along with a cache control parameter and the data cached in the localStorage object is subsequently invalidated according to the cache control parameter.

6. A computer program product for shared data storage in page processing over a computer communications network, the computer program product comprising:

a computer readable storage medium comprising a storage device having computer readable program code embodied therewith, the computer readable program code comprising:

computer readable program code for registering a content browser executing in memory of a computer with a remote storage service;

computer readable program code for receiving content from a content server over the computer communications network;

computer readable program code for invoking in the content browser an instance of a localStorage object defined in a Web storage application programming interface of the hypertext markup language to cache data associated with the content according to a unique key; and, computer readable program code for responding to the invocation of the instance of the localStorage object by storing the data in the remote storage service in reference to the unique key and responding to requests to retrieve the data from the instance of the localStorage obiect in reference to the unique key by retrieving the data from the remote storage service over the computer communications network with reference to the unique key.

7. The computer program product of claim 6, further comprising:

computer readable program code for retrieving the unique key corresponding to the data;

computer readable program code for invoking the instance of the localStorage object with the unique key; and, computer readable program code for responding to the invocation of the instance of the localStorage object with the unique key by retrieving the data from the remote storage service with reference to the unique key.

8. The computer program product of claim 6, wherein the remote storage service is a Web accessible resource by way of a representative state transfer (REST) application programming interface (API).

9. The computer program product of claim 8, further comprising computer readable program code for configuring the content browser to access the remote storage service at a specified Web accessible uniform resource identifier (URI).

10. The computer program product of claim 8, further comprising computer readable program code for configuring a Web application rendered in the content browser to access the remote storage service at a specified Web accessible uniform resource identifier (URI).

11. The computer program product of claim 6, wherein the localStorage object is invoked along with a cache control parameter and the data cached in the localStorage object is subsequently invalidated according to the cache control parameter.

* * * * *